United States Patent [19]

Brien

[11] Patent Number: 4,908,739

[45] Date of Patent: Mar. 13, 1990

[54] LIGHT DIFFUSING RING FOR WRISTWATCH

[76] Inventor: André Brien, 1390 Boul. De La Concorde W., Apt. 408, Laval-des-Rapides, Quebec, Canada, H7N 5P5

[21] Appl. No.: 285,743

[22] Filed: Dec. 16, 1988

Related U.S. Application Data

[63] Continuation of Ser. No. 170,870, Sep. 29, 1988, abandoned.

[51] Int. Cl.$^4$ .................... G01D 11/28

[52] U.S. Cl. .................... 362/23; 368/67

[58] Field of Search .................... 362/23, 26, 27, 355, 362/311; 368/67, 227

[56] References Cited

U.S. PATENT DOCUMENTS

| | | | |
|---|---|---|---|
| 2,259,910 | 10/1941 | Rylsky | 362/26 |
| 2,703,547 | 3/1955 | Hardesty | 362/26 |
| 2,850,868 | 9/1958 | Köhler | 368/67 |
| 2,874,268 | 2/1959 | Martin | 362/27 |
| 2,907,869 | 10/1959 | Hudson et al. | 362/27 |
| 3,278,740 | 10/1966 | Madansky | 368/227 |
| 3,701,900 | 10/1972 | Thuler | 362/26 |
| 3,748,456 | 7/1973 | Brien | 368/227 |
| 3,754,130 | 8/1973 | Stone et al. | 368/227 |
| 4,250,575 | 2/1981 | Flumm | 368/227 |
| 4,253,171 | 2/1981 | Grinwald | 368/67 |
| 4,705,407 | 11/1987 | Brien | 368/227 |

FOREIGN PATENT DOCUMENTS

| | | | |
|---|---|---|---|
| 2339871 | 2/1975 | Fed. Rep. of Germany | 368/67 |
| 37769 | 8/1906 | Switzerland | 368/67 |
| 357345 | 11/1961 | Switzerland | 368/67 |
| 357346 | 11/1961 | Switzerland | 368/67 |
| 871377 | 6/1961 | United Kingdom . | |
| 2052114 | 1/1981 | United Kingdom . | |
| 2135083 | 8/1984 | United Kingdom | 368/67 |

*Primary Examiner*—Ira S. Lazarus

*Assistant Examiner*—Richard R. Cole

[57] ABSTRACT

A light diffusing ring for positioning in a wristwatch about the circumference of a time display face thereof to illuminate the face. The ring is constructed of light transmitting material. The ring defines a top and a bottom wall, parallel to one another and an inner side wall. An elongated cavity is formed in an outer side wall of the ring and extends at least in one quarter of the circumference of the ring. The cavity has a cross-section dimension to receive at least two lamps therein and spaced from one another.

11 Claims, 1 Drawing Sheet

LIGHT DIFFUSING RING FOR WRISTWATCH

This application is a continuation of application Ser. No. 170,870 allowed on Sept. 29, 1988 and now abandoned.

BACKGROUND OF INVENTION (a) Field of the Invention

The present invention relates to a novel light diffusing ring having elongated cavities formed in an outer side wall thereof and extending at least in one quarter of the circumference of the ring whereby to receive at least two lamps therein in spaced apart relationship and wherein the ring is disposed about the circumference of a time display face of a wristwatch whereby to illuminate the face.

(b) Description of Prior Art

In my U.S. Pat. No. 4,705,407, which was issued on Nov. 10, 1987, I describe the use of a ring which is positioned about the circumference of a time display face of a wristwatch whereby to illuminate this face. In that Patent, I disclose a diffusing ring which is of substantially triangular cross-section and wherein the ring has a light receiving cavity to locate and conceal a lamp therein. The use of such cavity for supporting a lamp is also disclosed in British Pat. No. 871,377. However, I have found that when using such rings, it is time consuming to assemble those lamps with the rings as the lamps needed to be connected (soldered) to contacts connected to a battery. Also, it is time consuming to replace the lamps once they have burned out as the wire connections of the circuit also needed to be changed on these wires are hair thin and very delicate. With the prior art, such lamps were also lodged in a cavity in the watch casing, which is expensive to fabricate and often impossible due to thin casings and lack of space.

SUMMARY OF INVENTION

In order to overcome the above mentioned disadvantages of the prior art, I have discovered a new light diffusing ring configuration I lodge above the display face of the watch inside the casing and which provides additional advantages wherein I can provide at least one additional spare lamp concealed in the ring to replace the lamp being utilized after it has burned out. I have also discovered that I can have at least two lamps connected in parallel with the connections of the lamps extending in the channel that I formed about the light diffusing ring. This I do by modifying the lamp terminals which is directly in contact with the battery wires. Also, I friction fit the lamps in the ring and I am able to provide additional spare lamps and/or an opposed connected lamp in the ring.

According to the above features of my invention, from a broad aspect, I provide a light diffusing ring for positioning in a wristwatch about the circumference of a time display face thereof to illuminate the face. The ring is constructed of light transmitting material. The ring has a top and bottom parallel walls and an inner side wall. An elongated cavity is formed in an outer side wall of the ring and extends at least in one quarter of the circumference of the ring. The cavity has a cross-section dimensioned to receive at least two lamps therein spaced from one another.

BRIEF DESCRIPTION OF DRAWINGS

A preferred embodiment of the present invention will now be described with reference to the examples thereof as illustrated in the accompanying drawings in which.

DESCRIPTION OF PREFERRED EMBODIMENTS

Figure 1:
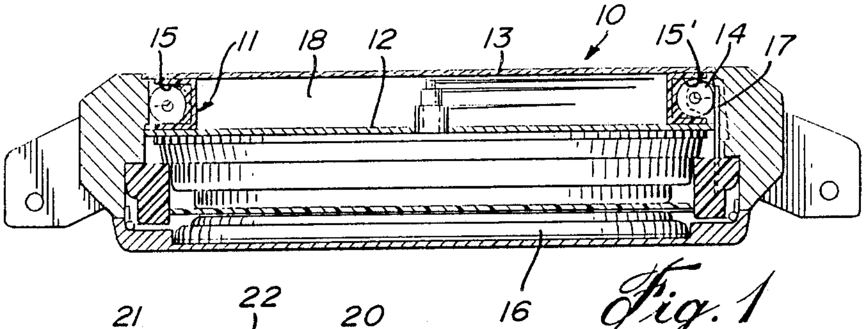
FIG. 1 is a section view of a wristwatch showing the disposition and construction of the light diffusing ring of the present invention.

Referring to the drawings, and more particularly to FIG. 1, there is shown generally at 10 a wristwatch incorporating therein the light diffusing ring 11 of the present invention. This ring 11 is herein shown positioned in the wristwatch about the circumference of a time display face 12 and held between the face 12 and the protective glass or plastic cover 13 of the watch. A lamp 14 is positioned within a cavity 15 provided in at least circumferential portion of the ring 11 whereby to transmit light along the ring to diffuse the light onto the time display face 12 to illuminate same. The light 14 is provided a current from an additional cell battery 16 and a pair of contacts 17, with one of the contacts being connected to a switch element (not shown) but well known in the art and also disclosed in my earlier referenced U.S. Patent.

Figure 2:
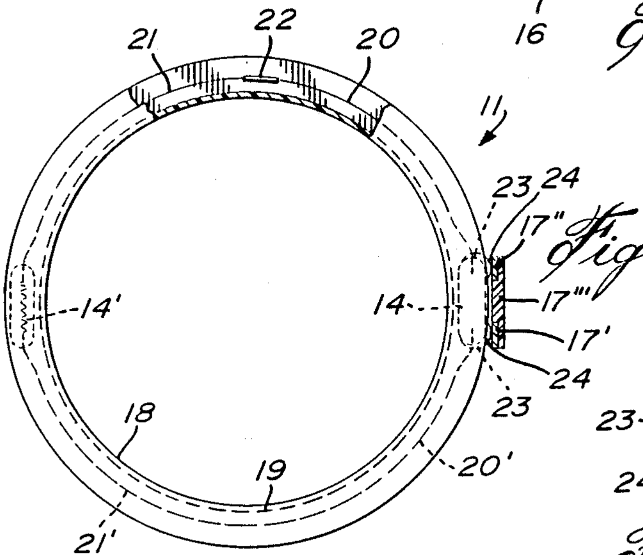
FIG. 2 is a top view of the light diffusing ring.
Figure 3:
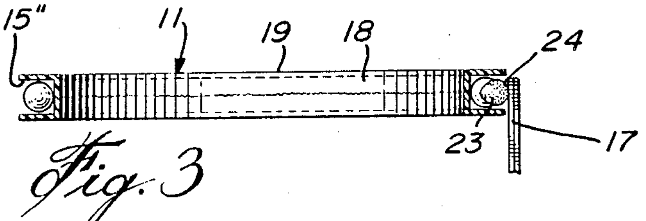
FIG. 3 is a section view of the light diffusing ring.

Referring now additionally to FIGS. 2 and 3, there will be described the construction of my new light diffusing ring 11. As herein shown, the ring is constructed of a rectangular cross-section but the inner face 18 thereof may have a multitude of configurations. For example, it could be a sloped face or a pyramidal face or have various reflective angles as is desired. The ring also has a top wall 19 and a bottom wall 20. The elongated cavity 15 is formed in the outer side wall 21 and extends at least in one quarter of the circumference of the ring. As herein shown in FIGS. 1 and 2, it extends entirely about the circumference and is dimensioned to receive at least two lamps 14 and 14' and spaced apart therein.

Figure 5:
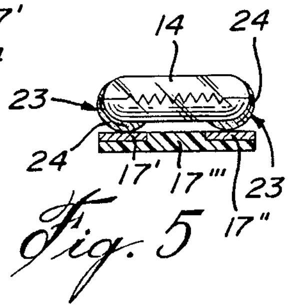
FIG. 5 is an elongated view of the lamp having the modified terminal ends.

As shown in FIG. 1, the elongated cavity 15 or channel extends all about the ring and has a cross-section defining an arcuate inner wall 15' and dimensioned to receive the lamps 14 and 14' in close friction fit therein. These lamps are also provided with end terminal wires with lamp 14 having terminal wires 20 and 20' and lamp 14' having end terminal wires 21 and 21'. Once the light lamps are placed in position in friction fit, these terminal wires may be interconnected together within the channel, such as shown in FIG. 2 at interconnection 22. Because these wires are hair fine wires, they cannot be easily detected through the light diffusing and therefore are substantially concealed therein. The channel 15 may also have a square inner cross-section as shown at 15'' in FIG. 3. This cross-section is also dimensioned to receive the lamps 14 and 14' in loose fit or in friction fit therein. Referring to FIG. 5, there is shown my modification of the terminal conductive ends 23 of one of the lamps, herein lamp 14 which is the one in contact with the battery circuit contacts 17. The terminals 23 are formed by a drop of epoxy conductive glue 24 applied to each of the terminal ends of the lamp 14. The conductive glue extends in at least a side wall end portion of the lamp 14. It is also conceived that the end contacts 23 could be made in mass production by spraying or conveying the ends of the lamps through a bed or spray of such epoxy conductive glue, which is available in the art. The battery circuit contacts 17 consists of two conductive strips 17' and 17" supported on an insulating strip 17'''. However, ordinary wires may be held in stationary position by other means to constitute the battery circuit contacts 17. Therefore, any lamp 14 is not soldered to the contacts 17 and can be replaced without having to remove solder and damage the contacts 17.

Figure 4:
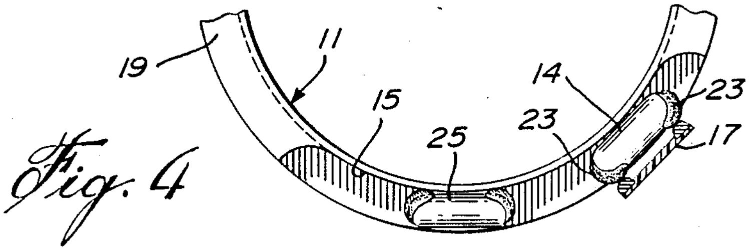
FIG. 4 is a top view of a portion of the light diffusing ring partly fragmented, and showing a modification thereof.

Referring now to FIG. 4, it can be seen that the cavity 15 may extend only in a quarter portion of the light diffusing ring whereby to receive therein two lamps, herein lamp 14 and a spare lamp 25 also having my improved terminal ends. The spare lamp 25 is preferably, although not exclusively, held in friction fit in the channel 15. It could be held in the channel by an adhesive tape, or a tacky glue, The spare lamp 25 would not conduct as one of its opposed end terminal would be isolated.

The light diffusing ring as herein described may be constructed of clear glass or plastic material or any suitable light transmitting material. The top face 19 or inner face 18 may also be colored or have an illuminescent paint thereon to add to the aesthetic of the wristwatch.

It is within the ambit of the present invention to cover any obvious modifications of the preferred embodiment described herein, provided such modifications fall within the scope of the appended claims.

I claim:

1. A light diffusing ring for positioning in a wristwatch immediately about the circumference of a time display face thereof and under a transparent cover to illuminate said face, said ring being constructed of light transmitting material, said ring having top and bottom parallel walls and an inner side wall, an elongated cavity formed in an outer side wall of said ring and extending at least in one quarter of the circumference of said ring, said cavity having a cross-sectional dimension to receive a lamp in close fit therein, said lamp having end terminals disposed over an outside side wall of said lamp adjacent opposed ends thereof, means to hold said terminals in position in said channel with said terminals in friction electrical contact with battery circuit contacts providing a voltage across said lamp to illuminate same for transmitting light along said ring to reflect and illuminate said time display face.

2. A light diffusing ring as claimed in claim 1, wherein said elongated cavity is a circumferential channel extending about said ring having a length sufficient to receive at least two of said lamps spaced from one another.

3. A light diffusing ring as claimed in claim 2, wherein said channel has an arcuate inner wall.

4. A light diffusing ring as claimed in claim 3, wherein said channel has a cross-section dimensioned to receive said lamps in friction fit therein to retain said lamps in position spaced-apart along said channel.

5. A light diffusing ring as claimed in claim 2, wherein said two lamps are each provided with end terminal wires, said lamps being positioned spaced-apart along said channel, said wires of adjacent end of said two lamps being connected together to connect said lamps in parallel with said wires extending in said channel, one of said lamps being connected across a pair of stationary contacts, said lamps being held in position in said channel by said stationary contacts and their interconnected terminal wires.

6. A light diffusing ring as claimed in claim 5, wherein said lamps are retained in said channel by friction fit therein.

7. A light diffusing ring as claimed in claim 5, wherein said lamps are disposed diagonally opposite from one another.

8. A light diffusing ring as claimed in claim 2, wherein said light diffusing ring is of rectangular cross-section, said inner side wall being a straight transverse wall.

9. A light diffusing ring as claimed in claim 1, wherein said light diffusing ring is a clear glass or plastic material.

10. A light diffusing ring as claimed in claim 9, wherein said top wall or inner side wall is a colored wall.

11. A light diffusing ring as claimed in claim 1, wherein said circuit contacts are secured to said one lamp terminals by a conductive epoxy glue.

* * * * *